United States Patent
Enloe et al.

(10) Patent No.: US 10,329,639 B2
(45) Date of Patent: Jun. 25, 2019

(54) MULTILAYER STEEL AND METHOD OF REDUCING LIQUID METAL EMBRITTLEMENT

(71) Applicant: GM GLOBAL TECHNOLOGY OPERATIONS LLC, Detroit, MI (US)

(72) Inventors: Charles Enloe, Grosse Pointe Woods, MI (US); Curt D. Horvath, Plymouth, MI (US); David Yang, Shanghai (CN); Qi Lu, Shanghai (CN); Wu Tao, Tianmen (CN)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 15/668,751

(22) Filed: Aug. 4, 2017

(65) Prior Publication Data
US 2019/0040487 A1  Feb. 7, 2019

(51) Int. Cl.
*C21D 9/46* (2006.01)
*C21D 8/02* (2006.01)
(Continued)

(52) U.S. Cl.
CPC ............. *C21D 9/46* (2013.01); *B23K 11/115* (2013.01); *B23K 11/166* (2013.01); *B23K 26/22* (2013.01);
(Continued)

(58) Field of Classification Search
CPC .......... C21D 9/46; C21D 8/0205; C21D 3/04; C21D 8/0257; C21D 2211/005; C21D 8/0236; B32B 15/013; B32B 15/04; B32B 15/043; B32B 15/18; B23K 11/115; B23K 11/116; B23K 26/322; B23K 26/22; B23K 2103/166; B23K 11/166; C23C 2/06; C23C 2/26; C23C 2/28; C23C 2/40; C23C 2/02;
(Continued)

(56) References Cited

U.S. PATENT DOCUMENTS

| | | | |
|---|---|---|---|
| 2013/0048150 A1* | 2/2013 | John | C21D 6/005 148/278 |
| 2016/0017452 A1* | 1/2016 | Puerta Velasquez | B32B 15/012 148/531 |

FOREIGN PATENT DOCUMENTS

JP  2017-075394  *  4/2017

OTHER PUBLICATIONS

Machine Translation, Otomo et al., JP 2017-075394, Apr. 2017. (Year: 2017).*

* cited by examiner

*Primary Examiner* — Michael E. La Villa
(74) *Attorney, Agent, or Firm* — Quinn IP Law (57) ABSTRACT

A multilayer steel includes a core formed of transformation-induced plasticity (TRIP) steel. A decarburized layer is exterior to the core on at least one side thereof. The decarburized layer has reduced carbon content relative to the core. A zinc-based layer is exterior to the decarburized layer. The decarburized layer may have a composition of at least 80 percent ferrite, such that LME is reduced or mitigated. In some configurations, the decarburized layer is between 10-50 microns thick. A method of creating a coated advanced high-strength steel component is also provided. An apparatus for forming a coated advanced high-strength steel is also provided. The core of the multilayer steel may have a carbon weight-percent of less than or equal to 0.4. The decarburized layer of the multilayer steel may have a (Continued)

carbon weight-percent of less than or equal to 50 percent of the carbon weight-percent of the core.

17 Claims, 3 Drawing Sheets

(51) Int. Cl.

| | |
|---|---|
| *C21D 3/04* | (2006.01) |
| *C23C 2/06* | (2006.01) |
| *B32B 15/01* | (2006.01) |
| *B23K 11/11* | (2006.01) |
| *B23K 11/16* | (2006.01) |
| *B23K 26/22* | (2006.01) |
| *B23K 26/322* | (2014.01) |
| *C23C 30/00* | (2006.01) |
| *C23C 2/28* | (2006.01) |
| *C23C 2/40* | (2006.01) |
| *C23C 2/02* | (2006.01) |
| *C23C 2/26* | (2006.01) |
| *B23K 103/16* | (2006.01) |

(52) U.S. Cl.
CPC .......... *B23K 26/322* (2013.01); *B32B 15/013* (2013.01); *C21D 3/04* (2013.01); *C21D 8/0205* (2013.01); *C21D 8/0236* (2013.01); *C21D 8/0257* (2013.01); *C23C 2/02* (2013.01); *C23C 2/06* (2013.01); *C23C 2/26* (2013.01); *C23C 2/28* (2013.01); *C23C 2/40* (2013.01); *C23C 30/00* (2013.01); *C23C 30/005* (2013.01); *B23K 2103/166* (2018.08); *C21D 2211/005* (2013.01); *Y10T 428/12458* (2015.01); *Y10T 428/12799* (2015.01); *Y10T 428/12958* (2015.01); *Y10T 428/12965* (2015.01); *Y10T 428/12972* (2015.01); *Y10T 428/2495* (2015.01); *Y10T 428/24967* (2015.01); *Y10T 428/24975* (2015.01); *Y10T 428/263* (2015.01); *Y10T 428/264* (2015.01); *Y10T 428/265* (2015.01)

(58) Field of Classification Search
CPC .................. C23C 30/00; C23C 30/005; Y10T 428/12799; Y10T 428/12958; Y10T 428/12965; Y10T 428/12972; Y10T 428/12458; Y10T 428/2495; Y10T 428/24967; Y10T 428/24975; Y10T 428/263; Y10T 428/264; Y10T 428/265
See application file for complete search history.

MULTILAYER STEEL AND METHOD OF REDUCING LIQUID METAL EMBRITTLEMENT

INTRODUCTION

This disclosure generally relates to methods and compositions for reducing susceptibility to liquid metal embrittlement in advanced high-strength steels. In particular, the methods and compositions herein reduce liquid metal embrittlement as a result of welding.

SUMMARY

A multilayer steel is provided. The multilayer steel includes a core formed of transformation-induced plasticity (TRIP) steel. A decarburized layer is exterior to the core on at least one side thereof. The decarburized layer has reduced carbon content relative to the core. A zinc-based layer is exterior to the decarburized layer. The decarburized layer may be composed of at least 80 percent ferrite. In some configurations, the decarburized layer is between 10-50 microns thick.

The core of the multilayer steel may have a carbon weight-percent of less than or equal to 0.4. The decarburized layer of the multilayer steel may have a carbon weight-percent of less than or equal to 50 percent of the carbon weight-percent of the core.

A method of creating a coated advanced high-strength steel component is also provided. The method includes cold-rolling a core from transformation-induced plasticity (TRIP) steel, and annealing the TRIP steel core. The method also includes decarburizing an exposed surface of the TRIP steel core to form a decarburized layer. The decarburized layer being composed of equal to or greater than 80 percent ferrite. The method further includes applying a zinc-based coating to the decarburized layer to form a coated blank, which may be in coil form or as components separated from the coil, and welding the coated blank having the decarburized layer on an exterior surface thereof.

Decarburizing the exposed surface of the TRIP steel core may occur in an environment with a dew point of greater than −5° C., such that the internal oxidation of silicon and manganese occurs within the decarburized layer. Decarburizing the exposed surface of the TRIP steel core may also occur in an environment with a dew point of less than −5° C., such that the external oxidation of silicon and manganese occurs substantially only at the exposed surface of the decarburized layer.

An apparatus for forming a coated advanced high-strength steel is also provided, and includes an annealing apparatus configured to anneal a core formed of TRIP steel. A decarburizing apparatus is configured to decarburize at least one exposed surface of the steel core to form a decarburized layer thereon, such that the decarburized layer is composed of equal to or greater than 80 percent ferrite.

A galvanizing apparatus is configured to apply a zinc-based coating to the decarburized layer to form a coated blank, which may be in coil form or components separated from a coil. Additionally, a welding apparatus is configured to weld the coated blank, having the decarburized layer on an exterior surface thereof, to at least one other component.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
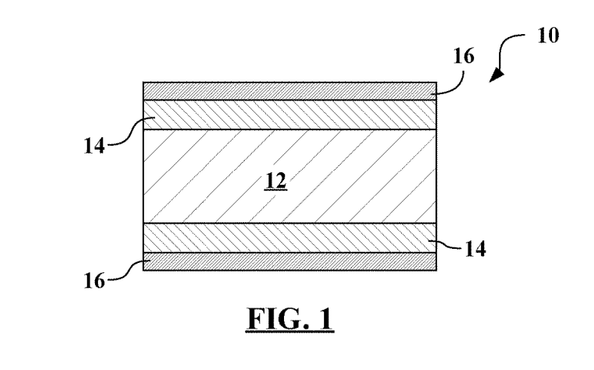
FIG. 1 is a schematic, cross-sectional diagram of a multilayer steel, illustrating a decarburized layer and a zinc-based coating.

In the drawings, like reference numbers correspond to like or similar components whenever possible throughout the several figures. There is shown in FIG. 1 a schematic, diagrammatic view of a multilayer steel 10. In general, the multilayer steel 10 may be referred to as an advanced high-strength steel (AHSS) or, more-specifically, as part of the third generation of AHSS.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The multilayer steel 10 is at least partially formed from one of several types of transformation-induced plasticity (TRIP) steel. The disclosure herein may simply refer to TRIP steel, for brevity, but the components and process disclosed apply with equal force to all of the related steel types and grades. TRIP steels may include any steel in which a metastable austenite transforms displacively to martensite (BCT or HCP), with resultant work hardening. Characteristics of TRIP steels result in favorable combinations of strength and ductility, but may be subject to liquid metal embrittlement (LME) without the structural and processing improvements described herein. Representative steels include, any generation of TRIP, including, but are not limited to: TBF (TRIP-aided bainitic ferrite), Q&P (quench and partition), and carbide free bainite.

Other metals, such as twinning-induced plasticity (TWIP) steel, may also benefit from the techniques described herein. TWIP steel includes higher levels of Manganese (Mn), beyond 20 weight-percent (wt %), compared to TRIP steel.

Additionally, the structures, methods, and apparatuses described herein may be applicable to TBF, Q&P, and carbide free banite steels.

In the multilayer steel 10 shown, a core 12 is formed of TRIP steel, which is a form of AHSS. TRIP steel generally includes at least 5 percent retained austenite, in addition to a material composition that may include, without limitation: ferrite, martensite, and bainite. The core 12 generally includes carbon (C) content of less than, or equal to, 0.4 weight-percent (wt %), although some configurations have less than, or equal to, 0.2 weight-percent; silicon (Si) content greater than, or equal to, 0.5 weight-percent, but often greater than 0.75 weight-percent Si; and manganese (Mn) content of, for example, between 2 to 5 weight-percent, although medium manganese TRIP steels may include Mn levels of between 5 to 12 weight-percent Mn.

In some configurations, aluminum (Al) may also be included in the TRIP steel forming the core 12, at between 0.5-2.0 weight-percent. The aluminum may be substituted for some of the silicon, or may be in conjunction therewith. Aluminum, like silicon, minimizes carbide formation and growth, which helps retain austenite within the TRIP steel matrix.

The multilayer steel 10 also includes at least one decarburized layer 14, which is exterior to the core 12. In the configuration shown, the multilayer steel 10 includes both a first and second decarburized layer 14. Either the upper or lower decarburized layer 14, as viewed in the figure, may be referred to as the first or second, and the composition of both may be substantially identical.

The decarburized layer 14 has reduced carbon content, relative to the core 12. Additionally, the decarburized layer 14 has increased ferrite content, relative to the core 12. The decarburized layers 14 are portions of the same TRIP steel as the core 12, but have been treated to remove carbon therefrom, as described herein.

Some illustrative processes for producing the decarburized layers 14 are described herein. As used herein, description of the core 12 is also representative of the pre-decarburization state of the decarburized layer 14, which is a modified layer of the core 12.

Formation of the decarburized layers 14 involves removing carbon from the outer surface of the core 12, such that the decarburized layers 14 have a gradient of carbon content—with lower content at the very exterior and greater content further toward the core 12. The decarburized layers 14 extend from the outer surface portions of the core 12 to a depth at which the carbon content reaches a specific percentage of the carbon content of the core 12.

For example, and without limitation, the decarburized layers 14 may be defined as extending as far as the carbon content is reduced to 20% of the bulk carbon content of the core 12. Therefore, in configurations where the core 12 has carbon content of less than, or equal to, 0.4 wt %, the decarburized layers 14 extend until the carbon content is less than, or equal to, 0.08 wt %; and in configurations where the core 12 has carbon content of less than, or equal to, 0.2 wt %, the decarburized layers 14 extend until the carbon content is less than, or equal to, 0.04 wt %.

In other configurations, the decarburized layers 14 may be defined as extending to the depths at which the carbon content is reduced to 50% of the bulk carbon content of the core 12. Therefore, the carbon content throughout the decarburized layers 14 is less than or equal to 50% of the bulk carbon content of the core 12, but likely much lower at the outer surfaces. The reduced carbon levels within the decarburized layers 14 results in high levels of ferrite, exceeding 80 percent, within the decarburized layers 14 following heat treatment. Where the decarburized layers 14 have carbon content of less than 0.2 wt %, the grain structure of the becomes highly ferritic.

The multilayer steel 10 also includes a zinc-based layer, or zinc coating 16, exterior to each of the decarburized layers 14. The zinc coating 16 may also be referred to as a galvanic coating or zinc galvanic coating. Note that the decarburized layers 14 are treated portions of the core 12, but with a different structure formed by decarburization. However, the zinc coating 16 is a different material that is applied to the core 12 and the decarburized layers 14. The decarburized layers 14 may be considered to be one piece with the core 12, while the zinc coating 16 would generally be considered a different piece that is substantially adhered to the decarburized layers 14.

The zinc coating 16, and similar coatings, offers cathodic protection, such that the coating acts as a sacrificial layer and corrodes instead of the underlying steel component, generally even where a portion of the underlying steel is exposed. As used herein, the zinc coating 16 refers to a coating of elemental zinc (Zn) or a zinc alloy having at least 50-percent zinc. Numerous alloying elements may be used with zinc for galvanizing steel components, including the TRIP steel described herein.

Galvanizing the multilayer steel 10 may occur by hot-dipping the core 12 and decarburized layers 14 in a galvanization bath. Alternatively, the zinc coating 16 may be applied via electro-galvanizing.

In an alternative configuration, the zinc coating 16 could be applied directly to the untreated, non-decarburized, core 12 to form a simple, galvanized TRIP steel blank. However, in the configuration described herein, the zinc coating 16 is applied to the exterior of the decarburized layers 14, such that the core 12 is separated from the zinc coating 16 by the decarburized layers 14.

TRIP steels, such as the multilayer steel 10, may be cold-worked into high-strength, three-dimensional components. In turn, the high-strength, three-dimensional components may by attached, such as through welding techniques, to other components. However, many TRIP steels are subject to liquid metal embrittlement (LME) when welded. The multilayer steel 10, and methods of producing the same, described herein provide improved weldability over other TRIP steels, as the features of the multilayer steel 10 make it relatively less susceptible to LME.

The structures of FIG. 1 are basic illustrations, and the portion of the multilayer steel 10 illustrated may be part of a blank that will be, or has been, converted into a high-strength, three-dimensional component. In particular, the multilayer steel 10 may be welded to another component, such as one formed from the same type of TRIP steel as used in the multilayer steel 10, or may be welded to a component formed from differing materials, including, without limitation: other types of advanced high-strength steel (AHSS), high-strength steel (HSS), different grades or types of TRIP steel, TRIP steel lacking the decarburized layers 14, dual-phase steel (DP), aluminum alloy, or other alloys. Note that FIG. 1 may not be shown to scale, such that the core 12 may be significantly thicker, relative to the decarburized layers and the zinc coating 16, than illustrated in FIG. 1.

The high-strength, three-dimensional components formed from the multilayer steel 10 described herein may be incorporated into many devices, such as vehicles. Such high-strength structures are particularly suitable for use in components of an automobile or other rolling platforms, including, without limitation: motorcycles, boats, tractors, buses, mobile homes, campers, and tanks. However, they may also be used in a variety of other industries and applications, including, without limitation: aerospace components, consumer goods, office equipment and furniture, industrial and construction equipment and machinery, farm equipment, or heavy machinery.

Other exemplary structures that have frames that can be manufactured by the current technology include construction and buildings, such as houses, offices, bridges, sheds, warehouses, and devices. It will be appreciated by those skilled in the art that numerous other components may be fabricated by the methods of the present disclosure, and that such additional components are deemed to be within the scope of the present disclosure.

Specific structural components capable of being formed of galvanized steel alloy include, without limitation: those used in automotive applications including, but not limited to, rocker rails, engine rails, structural pillars, A-pillars, B-pillars, C-pillars, D-pillars, bumper, hinge pillars, cross-members, body panels, structural panels, door panels, and door components, interior floors, floor pans, roofs, hoods, exterior surfaces, underbody shields, wheels, storage areas, including glove boxes, console boxes, trunk lids, trunks, trunk floors, truck beds, lamp pockets and other components, shock tower cap, control arms and other suspension, undercarriage or drive train components, and the like. While exemplary components may be illustrated and described throughout the specification, it is understood that the inventive concepts in the present disclosure may also be applied to any structural component capable of being formed of galvanized steel alloy. Specifically, the present disclosure is particularly suitable for any component subject to loads or requiring cathodic protection.

Figure 2:
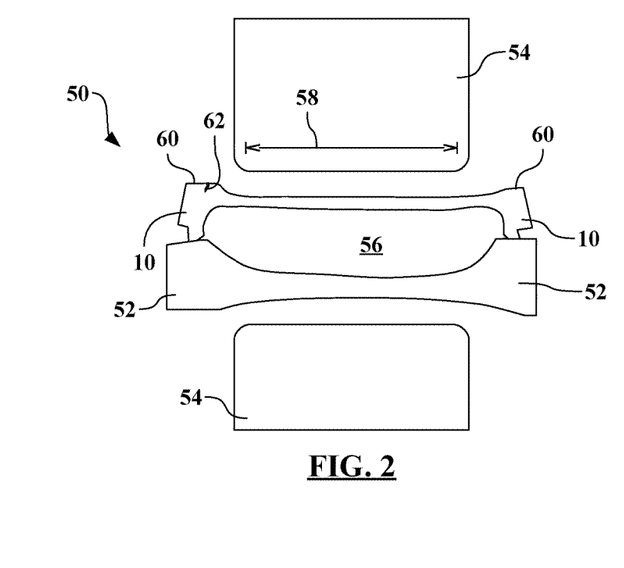
FIG. 2 is a schematic illustration of a resistance spot weld, which may be formed with multilayer steel, such as that shown in FIG. 1.

Referring to FIG. 2, and without continued reference to FIG. 1, there is shown a weld nugget 50. The weld nugget 50 illustrated is formed via resistance spot welding (RSW) techniques. However, the discussion herein applies with equal weight to laser spot welding (LSW) techniques. The weld nugget 50 is illustrated in FIG. 2 as a planar cut. This type of cut may be used to analyze welding techniques and materials, by slicing into an already-completed weld, in order to analyze the interior thereof.

As illustrated in FIG. 2, a portion of the multilayer steel 10 is welded to an auxiliary component 52, which may be substantially similar to the multilayer steel 10, or may be a different metal. A pair of weld caps 54, which are shown retracted, are pressed against the multilayer steel 10 and the auxiliary component 52, and a voltage is applied therebetween. Current flowing between the weld caps 54 resistively heats the metals, particularly at a junction between multilayer steel 10 and the auxiliary component 52, which creates a liquid region. After removal of the voltage, the liquid region solidifies to form a weld joint 56, which ties portions of the multilayer steel 10 and the auxiliary component 52 together.

As shown in FIG. 2, the weld caps 54 have a cap width 58. Just beyond the cap width 58, the spot welding process forms shoulders 60 on the multilayer steel 10. These areas are particularly susceptible to Liquid metal embrittlement (LME) and the cracks resulting therefrom. An LME crack 62 is shown on one of the shoulders 60, solely for illustrative purposes. The LME crack 62 is shown in FIG. 2 only to illustrate the location and relative size of possible cracking resulting from LME. In fact, the multilayer steel 10 is configured to substantially reduce the chances of the LME crack 62 forming. In materials that are more susceptible to LME, additional LME cracks 62, of various size and location, would likely be present. Note that the drawings are not necessarily to scale, such that the LME crack 62 could be larger or smaller relative to the surrounding structures.

The zinc coating 16 melts along much of the weld nugget 50 during the resistance spot welding (RSW) process. Generally, the zinc coating 16 melts, at least, to the shoulders 60, such that it may contribute to LME from the center of the weld nugget 50 out to the shoulders 60, and possibly beyond.

Liquid metal embrittlement (LME) may occur through different mechanisms resulting, at least partially, from liquid zinc. Zinc has a melting temperature of 420° C. At temperatures above 420° C., at which liquid zinc is present, the zinc begins to wet iron grain boundaries, such as those within TRIP steels that may result in LME along regions of the weld nugget 50 where the zinc coating 16 melts. Furthermore, small cracks, such as those caused by tensile stresses, may be exacerbated by wetting from liquid zinc.

Where temperatures are favorable—e.g., above the melting point of zinc or zinc alloy for some high-strength or advanced high-strength steels—and the multilayer steel 10 is exposed to tensile stress, the liquid zinc can wet exposed grain boundaries of the TRIP steel and cause de-cohesion or separation along the grain boundaries. Therefore, the zinc attacks grain boundaries which can form cracks associated with LME.

Therefore, three factors generally contribute to LME in TRIP steels: tensile stress, liquid zinc, and grain boundary area. In reducing the relatively high levels of carbon in the surface regions of the decarburized layers 14, the microstructure of the TRIP steel transforms, such that it subsequently includes relatively lower levels of austenite and relatively higher levels of ferrite, compared to the core 12.

The TRIP steel within the decarburized layers 14 may also undergo phase transformation at higher temperatures during the resistance spot weld process, which reduces the tensile stresses occurring at the exterior of the weld nugget 50 and, in particular, on the shoulders 60. Additionally, internally-oxidized silicon and manganese within the decarburized layers 14 may enhance solubility of zinc into the TRIP steel, such that the zinc does not provide detrimental wetting on the iron grain boundary as cracking progresses in a cooperative LME mechanism. Therefore, the multilayer steel 10 can be galvanized and, subsequently, welded at relatively high (localized) temperatures during, while still avoiding or mitigating LME, due to the decarburized layers 14. Removing carbon may also reduce the grain boundary area and grain boundary energy of the decarburized layers 14.

Generally, advanced high-strength steels, such as TRIP steels, are not decarburized, in order to avoid any loss of strength that may occur when carbon is removed from the alloy, and also to limit unwanted surface oxidation or unwanted process complications. However, in the multilayer steel 10, the decarburized layer 14 is relatively thin, and is only formed on the exposed surfaces of the TRIP steel forming the core 12, such that there is relatively little reduction in the strength of the multilayer steel 10. Generally, the decarburized layer 14 has a thickness of less than or equal to about 50 microns (micrometers). In some configurations the decarburized layer 14 has a thickness of greater than or equal to about 10 micrometers.

Note, however, that narrower or wider ranges may be used for the thickness of the decarburized layers 14, depending on the exact grade of TRIP steel, the thickness of the TRIP steel, and the exact resistance spot weld processes used. Note that the decarburized layers 14 and the zinc coating 16 may not be viewable on the scale shown and are, therefore, not numbered in FIG. 2. For example, in applications where the multilayer steel 10 is relatively thick, the decarburized layers 14 could be larger, up to 100 microns, because there would be relatively less reduction in overall strength caused by the decarburized layers 14.

A controlled decarburization process creates the thin, surface, decarburized layer 14 having a reduced carbon content compared to a bulk carbon content in the core 12 of the cold worked TRIP steel. As discussed herein, the decarburized layers 14 may be formed on the core 12 prior to application of the zinc coating 16.

Note that cracks formed as a result of LME may regularly be larger than 50 microns, and are capable of being greater than 250 microns. In the multilayer steel 10, the decarburized layer 14 may be between 10-50 microns thick, such that the entire possible depth of LME cracking is not decarburized.

In the multilayer steel 10, the decarburized layers 14 have a composition of at least 80 percent ferrite, with many configurations having at least 90 percent ferrite. This is greater than the ferrite composition of the core 12. Note that some configurations may create and utilize even greater percentages of ferrite in the decarburized layers 14. The ferrite composition of the decarburized layers 14 alters the transformation temperature and phase change process, relative to the core 12, during the resistance spot weld applied between the multilayer steel 10 and the auxiliary component 52.

For the illustrative multilayer steel 10 described herein, the decarburized layer 14 has a carbon weight-percent (wt %) of less than or equal to 50 percent (half) of the carbon weight-percent of the core 12. Depending on the type of TRIP steel used, the core 12 may have a carbon weight-percent of less than or equal to 0.4, such that the decarburized layer 14 has, at most, a carbon weight-percent of less than or equal to 0.2.

Any methods, algorithms, and apparatuses described herein may be used to improve weldability of TRIP steels. In particular, to limit or minimize liquid metal embrittlement (LME) resulting from welding processes, particularly resistance spot welding (RSW) or laser spot welding (LSW).

In configurations without the zinc coating 16, the decarburized layers 14 still display improved weldability relative to the TRIP steels without the decarburized layers 14. In particular, consistency of the measured mechanical abilities of resulting spot welds are improved relative to welding of only the core 12, without the decarburized layers 14. Therefore, the core 12 and decarburized layers 14 may improve weldability over single layer TRIP steels.

Figure 3A:
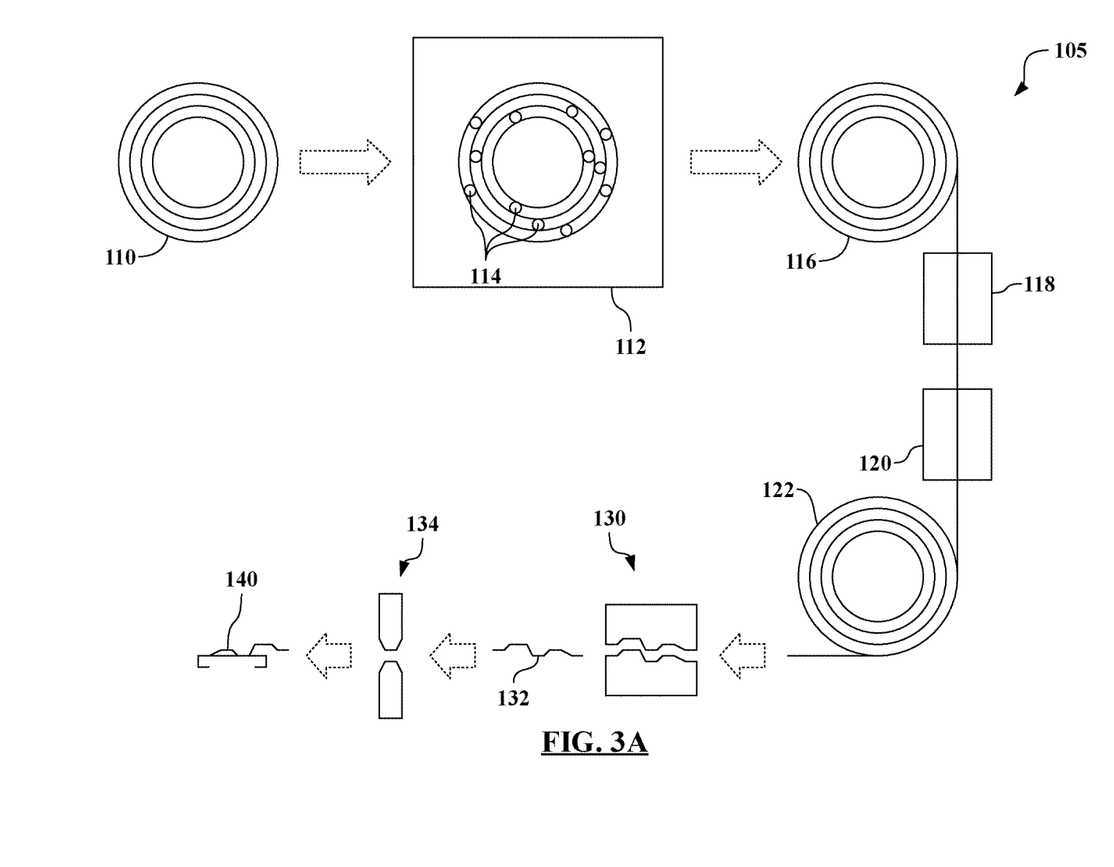
FIG. 3A is a schematic processing diagram illustrating a batch method for producing multilayer steel, such as that shown in FIG. 1, or components made therefrom.
Figure 3B:
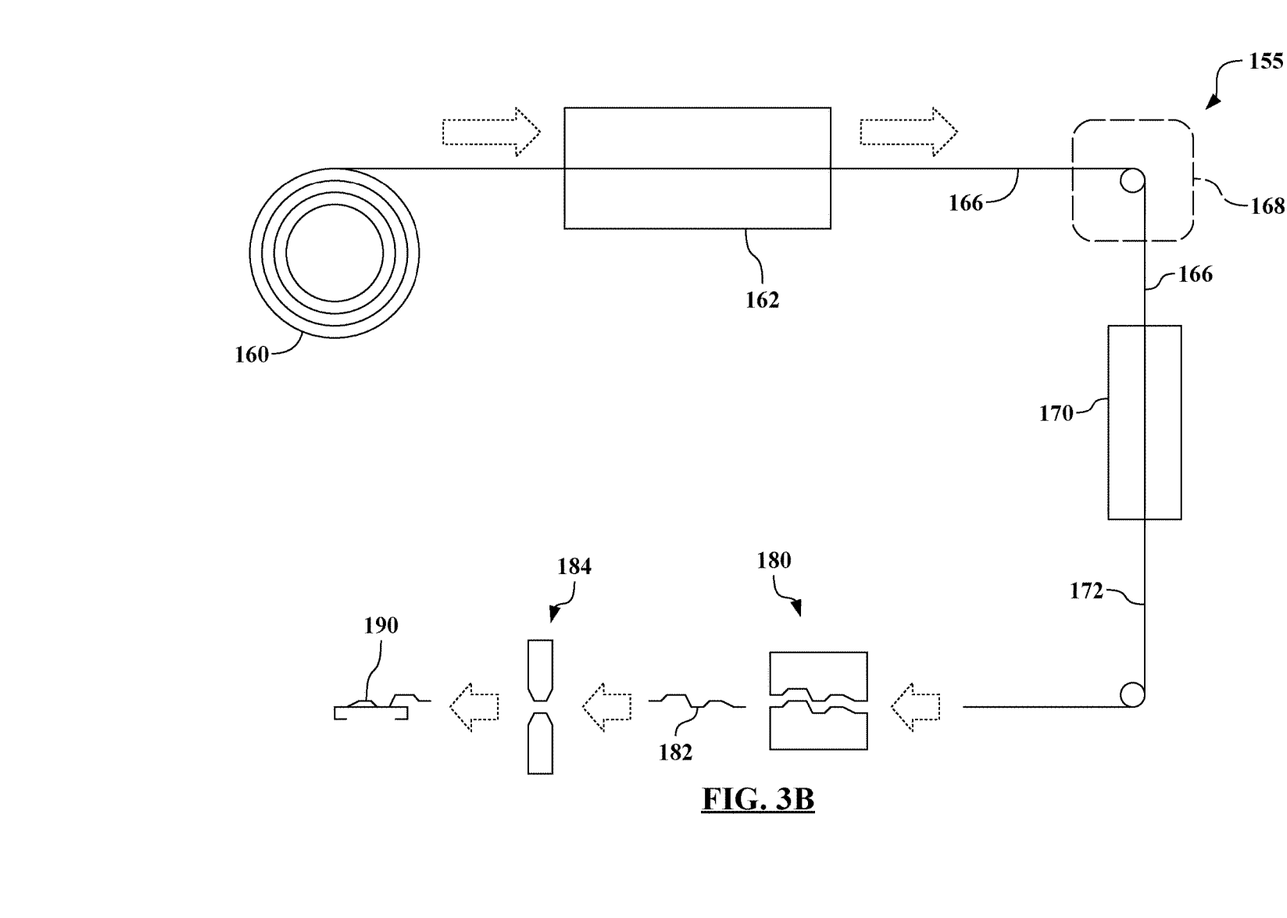
FIG. 3B is a schematic processing diagram illustrating a continuous method for producing multilayer steel, such as that shown in FIG. 1, or components made therefrom.

Referring now to FIGS. 3A and 3B, and with continued reference to FIGS. 1-2, there are shown diagrammatic illustrations of systems or apparatuses for producing galvanized, advanced high-strength steels that mitigates LME during welding. The multilayer steel 10 is one form of steel that may be produced with the systems shown in FIGS. 3A and 3B.

FIG. 3A shows an apparatus configured to use a batch method for producing steels like the multilayer steel 10. FIG. 3B shows an apparatus configured to use a continuous method for producing steels like the multilayer steel 10. FIGS. 3A and 3B illustrate both equipment and methods for producing coated, multilayer, advance high-strength steels.

As viewed in FIG. 3A, a batch apparatus 105 begins with a TRIP coil 110, which is a cold-rolled coil of TRIP steel, such as the type making up the core 12 shown in FIGS. 1 and 2. The TRIP coil 110 is moved, as a unit, into a batch decarburizer 112.

Prior to entrance into the batch decarburizer 112, the TRIP steel may be cold-rolled or cold-worked into its thin configuration for coiling. The annealing process prepares the core 12 for subsequent cold-working to a final component shape, which may then be welded to other components.

In addition to heat treating the core 12, the batch decarburizer 112 is configured to remove carbon from the core 12, such that it forms the decarburized layers 14. Note that a plurality of spacers 114 may be placed between the layers of the TRIP coil 110, in order to promote decarburizing gases flowing through the TRIP coil 110 and forming the decarburized layers 14 on both sides of the core 12.

In order to effect decarburization, the TRIP coil 110 is heated and placed into a specific gaseous environment. Note that, in alternative configurations, the annealing and decarburzing may occur via separate processes and in separate apparatuses or assemblies. Furthermore, the coiled nature of the materials is for illustrative purposes only, and other configurations or shapes of the bulk material may be used within the batch apparatus 105.

Decarburizing an exposed surface of the TRIP coil 110 may include disposing the blank in an environment within the batch decarburizer 112 that is non-oxidizing to iron. For example, and without limitation, the environment may be referred to as a wet atmosphere and includes one or more of the following: nitrogen ($N_2$), hydrogen ($H_2$), carbon monoxide (CO), carbon dioxide ($CO_2$), and water ($H_2O$). The wet atmosphere is non-oxidizing to iron (Fe), but capable of oxidizing carbon—such into carbon dioxide or carbon monoxide—and removing it from exterior surfaces of the TRIP coil 110 via evolution.

In one illustrative configuration or variation, a suitable wet atmosphere within the batch decarburizer 112 includes nitrogen and water and has a dew point of greater than about $-10°$ C. In one illustrative configuration or variation, the decarburizing occurs at a temperature of greater than or equal to about 500° C. in an environment including nitrogen and water. The decarburizing may include heating the blank with peak metal temperatures above about 500° C. in the wet non-oxidizing (to Fe) atmosphere. Elements within the wet non-oxidizing (to Fe) atmosphere may include, without limitation, $N_2$-$H_2$-CO-$CO_2$-$H_2O$, and the environment have a dew point greater than about $-5°$ C.

Additionally, decarburization in the batch decarburizer 112 may result in silicon (Si), manganese (Mn), or other alloying elements, being oxidized, but retained within the decarburized layers 14. This may be referred to as internal oxidation. In particular, oxidization of silicon, such that these is less silicon is in solution, may reduce zinc boundary diffusion into the iron within the decarburized layers 14 due to the increase of zinc solubility in iron. Oxidization of silicon may limit the wetting effect of liquid zinc along grain boundaries and small cracks generated by the liquid metal embrittlement (LME) mechanism. These additional oxidized elements, by virtue of removal from solid solution in iron, may also lower the boundary diffusion of zinc along grain structures within the decarburized layers 14. Therefore, internal oxidation of the other alloying elements may reduce additional mechanisms for LME.

In such internal oxidation, relatively high temperatures quickly diffuse oxygen into the surface layers, oxidizing the silicon and manganese therein. Configurations of TRIP steels having increased aluminum content may have further improvements in the decarburization process. Aluminum may increase the diffusion rate of carbon at high temperatures, or stability of ferrite at a given carbon concentration, such that the formation of the decarburized layers 14, with high levels of ferrite, is promoted by the aluminum.

However, other configurations use a modified annealing process to create oxides only at the outer surfaces of the TRIP steel. This may be referred to as external oxidation. Reduced atmospheric dew point does not promote diffusion of oxygen beyond the exposed surfaces. Therefore, the silicon and manganese at the exterior is removed from the exposed surfaces, but is not oxidized and is retained within the decarburized layers 14.

For example, external oxidation may occur in an environment in which the dew point less than −5° C., and likely below −10° C. External oxidation may remove sufficient amounts of carbon from the decarburized layers 14. The external oxidation may leave surface oxides that will be removed via cleaning, pickling, or both, as described herein relative to continuous processing, prior to welding the components formed.

Where the dew point is relatively high, the oxygen potential is relatively high, and internal oxidation occurs, due to faster diffusion of oxygen into the decarburized layers 14. Conversely, where the dew point is relatively low, the oxygen potential is relatively low, and only external oxidation occurs, due to slower diffusion of oxygen into the decarburized layers 14. External oxidation removes silicon and manganese from the decarburized layers 14, and creates surface oxides that are may need to be removed via cleaning or pickling.

At conclusion of decarburization within the batch decarburizer 112, the coil may be referred as a decarburized coil 116. The decarburized layer 14 of the decarburized coil 116 is composed of equal to or greater than 80 percent ferrite, which is a higher level of ferrite than contained within the core 12.

The decarburized coil 116 is moved, as a unit, from the batch decarburizer 112 to a heat treatment apparatus 118, which develops the proper microstructure for subsequent cold work of the steel. After heat treatment, the final grain structure of the core 12 of the TRIP steel includes retained austenite, as discussed above.

The decarburized coil 116 is moved from the heat treatment apparatus 118 to a galvanizer 120. The decarburized coil 116 could be recoiled, as a batch unit, before moving to the galvanizer 120, or fed continuously from the heat treatment apparatus 118 to the galvanizer 120. Alternatively, depending on the galvanizing process, such as hot-dipping, heat treating and galvanizing may occur in a single, combined, apparatus, or in closely-linked apparatuses.

A zinc-based coating is applied to the decarburized layer 14 in the galvanizer 120 to form a coated blank 122, which may still be in coil form or may be a component separated from a coil. After passing through the galvanizer 120, the material is substantially similar to the multilayer steel 10 shown in FIG. 1.

In the schematic diagram of FIG. 3A, the galvanizer 120 is shown operating in a continuous fashion between the decarburized coil 116 and the coated blank 122. However, the galvanizer 120 may also act on the entire decarburized coil 116 as a batch, instead of continuously. Note that the entire batch apparatus 105 may be within the same facility, such that the processes illustrated are substantially continuous, or may be dispersed throughout different facilities.

The coated blank 122, or portions cut therefrom, passes through a cold work or cold-forming apparatus 130. A plurality of formed components 132 are stamped, forged, or otherwise cold worked in the cold-forming apparatus 130. The formed components 132 are generally at the final shape, and are three-dimensional high-strength components formed from the multilayer steel 10.

A welding apparatus 134 welds the formed components 132 to at least one other component. The welding apparatus 134 is illustrated, schematically, for resistance spot welding (RSW), but may also be configured for, without limitation, laser spot welding (LSW) or other welding techniques. The welding apparatus 134 creates a welded assembly 140 from one or more of the formed components 132 and other components. In many cases, the welded assembly 140 will be subject to post-processing prior to final assembly.

The welding apparatus 134 operates on, and through, the decarburized layers 14 and the zinc coating 16 on the exterior surfaces of the formed components 132. However, the welding apparatus 134 operates in a substantially standard fashion, with application of pressure and voltage as if the welded components were not susceptible to liquid metal embrittlement (LME), such as zinc-coated high-strength steel. The decarburized layer 14 mitigates the amount of LME caused by the welding apparatus 134 on the multilayer steel 10, which may be similar to the weld nugget 50 illustrated in FIG. 2.

In alternative configurations, such as those using TRIP steel without the decarburized layers 14 formed thereon, the welding processes may need to be significantly more complex to prevent LME during, for example, RSW. In such alternative configurations, there may be relatively greater clamping force applied by the welding apparatus 134, or multi-pulse welding techniques may need to be used.

As viewed in FIG. 3B, a continuous apparatus 155 begins with a TRIP coil 160, which is a cold-rolled coil of TRIP steel, such as the type making up the core 12 shown in FIGS. 1 and 2. The TRIP coil 160 is moved, continuously, through a continuous annealer-decarburizer or, simply, continuous decarburizer 162.

Prior to entrance into the continuous decarburizer 162, the TRIP steel may be cold-rolled or cold-worked into its thin configuration for coiling. The annealing process prepares the core 12 for subsequent cold-working to a final component shape, which may then be welded to other components. Unlike the batch apparatus 105, in the continuous apparatus 155, the TRIP coil 160 is unwound to feed continuously through the continuous decarburizer 162. In the configuration shown, the continuous decarburizer 162 preforms the heat treatment processes performed by the heat treatment apparatus 118 in FIG. 3A. In addition to heat treating the core 12, the continuous decarburizer 162 is also configured to remove carbon from the core 12, such that it forms the decarburized layers 14 on the exterior, or exposed, surfaces thereof.

In order to effect decarburization, the TRIP coil 160 is heated and moved through a specific gaseous environment. The decarburization processes of the continuous decarburizer 162 may be similar that discussed above relative to the batch decarburizer 112. Note that, in alternative configurations, the annealing (heat treatment) and decarburzing may occur via separate processes and in separate apparatuses or assemblies, similar to the batch processes illustrated.

Decarburizing an exposed surface of the TRIP coil 160 may include disposing the blank in an environment within the continuous decarburizer 162 that is non-oxidizing to iron. For example, and without limitation, the environment may be referred to as a wet atmosphere and includes one or more of the following: nitrogen ($N_2$), hydrogen ($H_2$), carbon monoxide (CO), carbon dioxide ($CO_2$), and water ($H_2O$). The wet atmosphere is non-oxidizing to iron (Fe), but capable of oxidizing carbon—such into carbon dioxide or carbon monoxide—and removing it from exterior surfaces of the TRIP coil 160 via evolution.

In some configurations, the temperatures may be relatively higher in the continuous decarburizer 162 than in the batch decarburizer 112. The relative amount of time spent, by any given unit of the TRIP steel, may be lesser in the continuous decarburizer 162 than in the batch decarburizer 112. Therefore, increased temperatures may drive the oxidizing reactions at greater rates in the continuous decarburizer 162.

In one illustrative configuration or variation, a suitable wet atmosphere includes nitrogen and water and has a dew point of greater than about −10° C. In one illustrative configuration or variation, the decarburizing occurs at a temperature of greater than or equal to about 700° C. in an environment including nitrogen and water. The decarburizing may include heating the blank with peak metal temperatures above about 500° C. in the wet non-oxidizing (to Fe) atmosphere. Some embodiments may utilize temperatures of up to 500° C. in the wet non-oxidizing (to Fe) atmosphere. Elements within the wet non-oxidizing (to Fe) atmosphere may include, without limitation, N2-H2-CO-CO2-H2O, and the environment have a dew point greater than about −5° C.

Additionally, decarburization in the continuous decarburizer 162 may result in silicon (Si), manganese (Mn), or other alloying elements, being oxidized, but retained within the decarburized layers 14 or externally on the sheet surface. In particular, oxidization of silicon may reduce zinc diffusion along grain boundaries into the iron of the TRIP steel. Therefore, oxidation of the other alloying elements reduces additional mechanisms for liquid metal embrittlement (LME).

At conclusion of decarburization within the continuous decarburizer 162, the material may be referred as decarburized TRIP steel 166. The decarburized layer 14 of the decarburized TRIP steel 166 is composed of equal to or greater than 80 percent ferrite, which is a higher level of ferrite than contained within the core 12.

In some configurations, the decarburized TRIP steel 166 may be recoiled, prior to galvanization, such that there is a process break or pause in the continuous apparatus 155. Furthermore, surface cleaning, pickling, or both may occur in a cleaner 168, which is optional and shown in dashed lines in FIG. 3B. Although the cleaner 168 is only illustrated with respect to the continuous apparatus 155, note that the cleaner 168, or similar functionality, may also be incorporated into the batch apparatus 105.

In some cases, particularly where only external oxidation is formed on the TRIP steel, the surface may need to be cleaned or treated to remove surface oxides. The cleaner 168 may employ, for example and without limitation, physical, chemical, or electro-chemical cleaning techniques, including combinations thereof. The cleaner 168 removes oxides built up on the exterior of the decarburized layers 14 as a result of external oxidation in the continuous decarburizer 162.

In the configuration shown decarburized TRIP steel 166 is moved continuously from the continuous decarburizer 162 to a galvanizer 170, with possible passage through the cleaner 168. A zinc-based coating is applied to the decarburized layer 14 in the galvanizer 170 to form a coated blank 172. After passing through the galvanizer 170, the material is substantially similar to the multilayer steel 10 shown in FIG. 1.

The coated blank 172, or portions cut therefrom, passes through a cold-forming apparatus 180. A plurality of formed components 182 are stamped, forged, or otherwise cold worked in the cold-forming apparatus 180. The formed components 182 are generally at the final shape, and are three-dimensional high-strength components formed from the multilayer steel 10. In some configurations of the continuous apparatus 155, there may be a process break between the galvanizer 170 and the forming apparatus 180, such as for moving the coated blank 172 to a forming facility.

A welding apparatus 184 welds the formed components 182 to at least one other component. The welding apparatus 184 is illustrated, schematically, for resistance spot welding (RSW), but may also be configured for, without limitation, laser spot welding (LSW) or other welding techniques. The welding apparatus 184 creates a welded assembly 190 from the formed components 182.

The welding apparatus 184 operates on, and through, the decarburized layers 14 and the zinc coating 16 on the exterior surfaces of the formed components 182. However, the decarburized layer 14 mitigates the amount, or likelihood, of LME formed by the welding apparatus 184 on the multilayer steel 10, which may be similar to the weld nugget 50 illustrated in FIG. 2.

The detailed description and the drawings or figures are supportive and descriptive of the subject matter discussed herein. While some of the best modes and other embodiments have been described in detail, various alternative designs, configurations, and embodiments exist.

The invention claimed is:

1. A multilayer steel, comprising:
   a core formed of transformation-induced plasticity (TRIP) steel;
   a decarburized layer exterior to the core, wherein the decarburized layer has a carbon weight-percent of less than or equal to 50 percent of the carbon weight-percent of the core, and has at least 80 percent ferrite; and
   a zinc-based layer exterior to the decarburized layer.

2. The multilayer steel of claim 1, wherein the decarburized layer is between 10-50 microns thick.

3. The multilayer steel of claim 1, wherein the core includes a carbon weight-percent of less than or equal to 0.4.

4. The multilayer steel of claim 3, wherein the decarburized layer has a carbon weight-percent of less than or equal to 20 percent of the carbon weight-percent of the core.

5. The multilayer steel of claim 3, wherein the core has a first side and a second side, opposite the first side, and the decarburized layer is a first decarburized layer located on the first side of the core, and further comprising:
   a second decarburized layer exterior to the core on the second side of the core, wherein the second decarburized layer has carbon weight-percent of less than or equal to 50 percent of the carbon weight-percent of the core, and has at least 80 percent ferrite.

6. A multilayer steel, comprising:
   a core formed of transformation-induced plasticity (TRIP) steel, wherein the core has a first side and a second side, opposite the first side, and includes a carbon weight-percent of less than or equal to 0.4;
   a first decarburized layer exterior to the core on the first side of the core, wherein the first decarburized layer has reduced carbon content relative to the core;
   a second decarburized layer exterior to the core on the second side of the core, wherein the second decarburized layer has reduced carbon content relative to the core;

wherein the first decarburized layer and the second decarburized layer both have a composition of at least 90 percent ferrite; and a zinc-based layer exterior to both the first decarburized layer and the second decarburized layer.

7. The multilayer steel of claim 6, wherein the decarburized layer has a carbon weight-percent of less than or equal to 50 percent of the carbon weight-percent of the core.

8. The multilayer steel of claim 7, wherein the decarburized layer is between 10-50 microns thick.

9. A method of creating a coated advanced high-strength steel component, the method comprising:

cold-rolling a core from transformation-induced plasticity (TRIP) steel;

annealing the TRIP steel core;

decarburizing an exposed surface of the TRIP steel core to form a decarburized layer, wherein the decarburized layer is composed of equal to or greater than 80 percent ferrite and has a carbon weight-percent of less than or equal to 50 percent of the carbon weight-percent of the core;

applying a zinc-based coating to an exterior surface of the decarburized layer to form a coated blank; and welding the coated blank having the decarburized layer.

10. The method of claim 9, wherein annealing the TRIP steel core and decarburizing the exposed surface of the TRIP steel core occurs in a single process, within the same apparatus.

11. The method of claim 10, wherein decarburizing the exposed surface of the TRIP steel core includes oxidizing carbon into one of carbon monoxide and carbon dioxide.

12. The method of claim 11, wherein decarburizing the exposed surface of the TRIP steel core occurs at a temperature of greater than or equal to about 500° C. in an environment comprising nitrogen and water.

13. The method of claim 12, wherein decarburizing the exposed surface of the TRIP steel core occurs in an environment that is non-oxidizing to iron.

14. The method of claim 9, wherein decarburizing the exposed surface of the TRIP steel core occurs in an environment with a dew point of greater than −5° C., such that the internal oxidation of silicon and manganese occurs within the decarburized layer.

15. The method of claim 9, wherein decarburizing the exposed surface of the TRIP steel core occurs in an environment with a dew point of less than −5° C., such that the external oxidation of silicon and manganese occurs at the exposed surface of the decarburized layer.

16. The method of claim 9, wherein decarburizing the exposed surface of the TRIP steel core forms the decarburized layer at a thickness of between 10-50 micrometers, and wherein welding the decarburized layer of the coated blank includes resistance spot welding.

17. The method of claim 9, wherein decarburizing the exposed surface of the TRIP steel core forms the decarburized layer at a thickness of between 10-50 micrometers, and wherein welding the decarburized layer of the coated blank includes laser spot welding.

* * * * *